(12) United States Patent
Neganov

(10) Patent No.: US 11,481,372 B1
(45) Date of Patent: Oct. 25, 2022

(54) SYSTEMS AND METHODS FOR INDEXING MULTI-VERSIONED DATA

(71) Applicant: Aleksei Neganov, Agios Athanasios (CY)

(72) Inventor: Aleksei Neganov, Agios Athanasios (CY)

( * ) Notice: Subject to any disclaimer, the term of this patent is extended or adjusted under 35 U.S.C. 154(b) by 0 days.

(21) Appl. No.: 17/719,673

(22) Filed: Apr. 13, 2022

(51) Int. Cl.
*G06F 7/00* (2006.01)
*G06F 16/00* (2019.01)
*G06F 16/22* (2019.01)
*G06F 16/2458* (2019.01)
*G06F 16/23* (2019.01)

(52) U.S. Cl.
CPC ...... *G06F 16/2272* (2019.01); *G06F 16/2358* (2019.01); *G06F 16/2365* (2019.01); *G06F 16/2477* (2019.01)

(58) Field of Classification Search
None
See application file for complete search history.

(56) References Cited

U.S. PATENT DOCUMENTS

| | | | | |
|---|---|---|---|---|
| 2014/0279900 A1* | 9/2014 | Gupta | ............. | G06F 16/219 |
| | | | | 707/634 |
| 2015/0058556 A1* | 2/2015 | Hamedani | ............. | G06F 3/0685 |
| | | | | 711/114 |
| 2017/0177452 A1* | 6/2017 | Parab | ............. | G06F 3/067 |

* cited by examiner

*Primary Examiner* — Tuan A Pham
(74) *Attorney, Agent, or Firm* — ArentFox Schiff LLP; Michael Fainberg

(57) ABSTRACT

Disclosed herein are systems and methods for indexing multi-versioned data. In one aspect, a method includes: generating a first index for a first snapshot of a collection of data objects in a volume captured at a first time, wherein each data object is identified by a respective key; generating a second index for a second snapshot of the volume captured at a second time, wherein the second index includes a subset of sorted runs from the first index and one or more additional sorted runs; combining the first and the second index to form a multi-versioned log-structured object index that has sorted runs from both indexes; and wherein the combining further includes generating a global directory of the multi-versioned log-structured object index that identifies each snapshot and corresponding sorted runs.

17 Claims, 8 Drawing Sheets

900

```
┌──────────────────────────────────────────────────────────────────┐
│ Generate a first index for a first snapshot of a collection of  │── 902
│ data objects in a volume captured at a first time, wherein the  │
│ index comprises one or more sorted runs that include a first    │
│ data object and a second data object stored in the collection,  │
│ and wherein each data object is identified by a respective key  │
└──────────────────────────────────────────────────────────────────┘
                              │
                              ▼
┌──────────────────────────────────────────────────────────────────┐
│ Generate a second index for a second snapshot of the volume     │
│ captured at a second time, wherein the second index comprises   │── 904
│ a subset of sorted runs from the first index and one or more    │
│ additional sorted runs that include a different version of the  │
│ first data object and optionally a same version of the second   │
│ data object                                                      │
└──────────────────────────────────────────────────────────────────┘
                              │
                              ▼
┌──────────────────────────────────────────────────────────────────┐
│ Combine the first and the second index to form a multi-         │── 906
│ versioned log-structured object index that has sorted runs      │
│ from both indexes                                                │
└──────────────────────────────────────────────────────────────────┘
                              │
                              ▼
┌──────────────────────────────────────────────────────────────────┐
│ Generate a global directory of the multi-versioned log-         │── 908
│ structured object index that identifies each snapshot and       │
│ corresponding sorted runs                                        │
└──────────────────────────────────────────────────────────────────┘
```

900

902 — Generate a first index for a first snapshot of a collection of data objects in a volume captured at a first time, wherein the index comprises one or more sorted runs that include a first data object and a second data object stored in the collection, and wherein each data object is identified by a respective key

904 — Generate a second index for a second snapshot of the volume captured at a second time, wherein the second index comprises a subset of sorted runs from the first index and one or more additional sorted runs that include a different version of the first data object and optionally a same version of the second data object

906 — Combine the first and the second index to form a multi-versioned log-structured object index that has sorted runs from both indexes

908 — Generate a global directory of the multi-versioned log-structured object index that identifies each snapshot and corresponding sorted runs

FIG. 9

SYSTEMS AND METHODS FOR INDEXING MULTI-VERSIONED DATA

FIELD OF TECHNOLOGY

The present disclosure relates to the field of data storage, and, more specifically, to systems and methods for indexing multi-versioned data.

BACKGROUND

There are various applications that require access to a history of data changes including, but not limited to, information systems in banking, medicine, security, storage, etc. The ability to provide multiple versions of data at the same time can be used to handle multiple users simultaneously accessing the data. Many software applications process multi-versioned data in order to run "time-travel" queries against read-only views for a given timestamp or to get the difference between such views for two distinct timestamps (for both analytical and data auditing purposes). A notable example is the processing of scientific data, which changes over time. Many systems use locking for concurrency control and employ multi-versioning in order to support snapshot reads that are not blocked by write transactions.

An index is a data structure that improves the speed of data retrieval operations. An index on multi-versioned data may be used to quickly locate a specific version of a specific object, reconstruct the state of the system for a selected timestamp, or calculate the difference between the states of the system for two distinct timestamps. Unfortunately, known solutions either have poor write throughput such that they cannot be used for data with a large amount of changes, or the "time-travel" queries have poor performance. In particular, all methods that use B-Trees, R-trees, or their modifications, write data to external memory in a random manner. As a result, the performance of insertions is poor. For instance, many major relational database systems (including PostgreSQL and MS SQL Server) implement so-called "temporal tables" or "system-versioned temporal tables" as a pair of tables (a current table and a historic table), each with a primary B-Tree-like index or with some other index that implies random data writes or without any index.

SUMMARY

Aspects of the disclosure relate to the field of data storage. In particular, aspects of the disclosure describe methods and systems for indexing multi-versioned data.

In one exemplary aspect, the techniques described herein relate to a method for multi-versioned indexing of data objects, the method including: generating a first index for a first snapshot of a collection of data objects in a volume captured at a first time, wherein the index includes one or more sorted runs that include a first data object and a second data object stored in the collection, and wherein each data object is identified by a respective key; generating a second index for a second snapshot of the volume captured at a second time, wherein the second index includes a subset of sorted runs from the first index and one or more additional sorted runs that include a different version of the first data object and optionally a same version of the second data object; combining the first and the second index to form a multi-versioned log-structured object index that has sorted runs from both indexes; and wherein the combining further includes generating a global directory of the multi-versioned log-structured object index that identifies each snapshot and corresponding sorted runs such that the one or more sorted runs of the first index are mapped to the first snapshot, the one or more additional sorted runs of the second index are mapped to the second snapshot, and wherein the subset of sorted runs are mapped to the first snapshot and the second snapshot.

In some aspects, the techniques described herein relate to a method, wherein the multi-versioned log-structured object index has a first sorted run with a version of the first data object at the first time, a second sorted run with the different version of the first data object, and a third sorted run with the second data object, and wherein the global directory maps the first sorted run to the first snapshot, the second sorted run to the second snapshot, and the third sorted run to both the first snapshot and the second snapshot.

In some aspects, the techniques described herein relate to a method, further including: adding a respective index of each new snapshot captured of the volume to the multi-versioned log-structured object index and updating the global directory such that new data object versions are included in sorted runs specific to the respective index and common data object versions are included in sorted runs shared by multiple snapshots.

In some aspects, the techniques described herein relate to a method, wherein adding the respective index includes: adding, to the multi-versioned log-structured object index, elements of the respective index to elements of a previous snapshot with copy-on-write semantics, such that two or more snapshot indexes can share one or more sorted runs.

In some aspects, the techniques described herein relate to a method, wherein generating the index for the first snapshot includes: creating an empty index; adding, to the empty index, data entries corresponding to elements in the first snapshot in the one or more sorted runs; and constructing a directory that identifies the one or more sorted runs of the first snapshot.

In some aspects, the techniques described herein relate to a method, further including: determining whether the multi-versioned log-structured object index violates a compaction condition; and transforming, via a compaction algorithm, the multi-versioned log-structured object index to meet the compaction condition.

In some aspects, the techniques described herein relate to a method, further including reducing space amplification and/or write amplification.

In some aspects, the techniques described herein relate to a method, further including performing a point lookup query for a specific snapshot in the multi-versioned log-structured object index.

In some aspects, the techniques described herein relate to a method, further including: performing a key-range query for a specific snapshot by performing ranged queries in all sorted runs of the specific snapshot and merging results of the ranged queries together, wherein a more recent data object version is included in the merged results when individual ranged query results feature data objects with matching keys.

In some aspects, the techniques described herein relate to a method, further including: calculating a difference between snapshots in the multi-versioned log-structured object index by traversing through all keys in non-shared sorted runs.

In some aspects, the techniques described herein relate to a method, wherein sorted runs of the multi-versioned log-structured object index are distributed in any combination of a main memory and an external memory.

In some aspects, the techniques described herein relate to a method, wherein sorted runs of the multi-version log-structured object index are maintained on different devices with different data access latencies.

In some aspects, the techniques described herein relate to a method, wherein at least one sorted run of the multi-versioned log-structured object index is maintained in a write once read many (WORM) device.

In some aspects, the techniques described herein relate to a method, further including maintaining reference counters for sorted runs of the multi-versioned log-structured object index, wherein a respective counter for each respective sorted run is equal to a number of snapshot indexes that share the respective sorted run, and wherein a specific sorted run is removable when a reference counter value for the specific sorted run equal zero.

In some aspects, the techniques described herein relate to a method, further including removing the specific sorted run from the multi-versioned log-structured object index, wherein removal is one of a physical data removal from a storing device of the multi-versioned log-structured object index or a logical removal.

It should be noted that the methods described above may be implemented in a system comprising a hardware processor. Alternatively, the methods may be implemented using computer executable instructions of a non-transitory computer readable medium.

In some aspects, the techniques described herein relate to a system for multi-versioned indexing of data objects, including: a memory; and a hardware processor communicatively coupled with the memory and configured to: generate a first index for a first snapshot of a collection of data objects in a volume captured at a first time, wherein the index includes one or more sorted runs that include a first data object and a second data object stored in the collection, and wherein each data object is identified by a respective key; generate a second index for a second snapshot of the volume captured at a second time, wherein the second index includes a subset of sorted runs from the first index and one or more additional sorted runs that include a different version of the first data object and optionally a same version of the second data object; combine the first and the second index to form a multi-versioned log-structured object index that has sorted runs from both indexes; and wherein the combining further includes generating a global directory of the multi-versioned log-structured object index that identifies each snapshot and corresponding sorted runs such that the one or more sorted runs of the first index are mapped to the first snapshot, the one or more additional sorted runs of the second index are mapped to the second snapshot, and wherein the subset of sorted runs are mapped to the first snapshot and the second snapshot.

In some aspects, the techniques described herein relate to a non-transitory computer readable medium storing thereon computer executable instructions for multi-versioned indexing of data objects, including instructions for: generating a first index for a first snapshot of a collection of data objects in a volume captured at a first time, wherein the index includes one or more sorted runs that include a first data object and a second data object stored in the collection, and wherein each data object is identified by a respective key; generating a second index for a second snapshot of the volume captured at a second time, wherein the second index includes a subset of sorted runs from the first index and one or more additional sorted runs that include a different version of the first data object and optionally a same version of the second data object; combining the first and the second index to form a multi-versioned log-structured object index that has sorted runs from both indexes; and wherein the combining further includes generating a global directory of the multi-versioned log-structured object index that identifies each snapshot and corresponding sorted runs such that the one or more sorted runs of the first index are mapped to the first snapshot, the one or more additional sorted runs of the second index are mapped to the second snapshot, and wherein the subset of sorted runs are mapped to the first snapshot and the second snapshot.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 9 is a flow diagram illustrating a method for indexing multi-versioned data.

DETAILED DESCRIPTION

Figure 1:
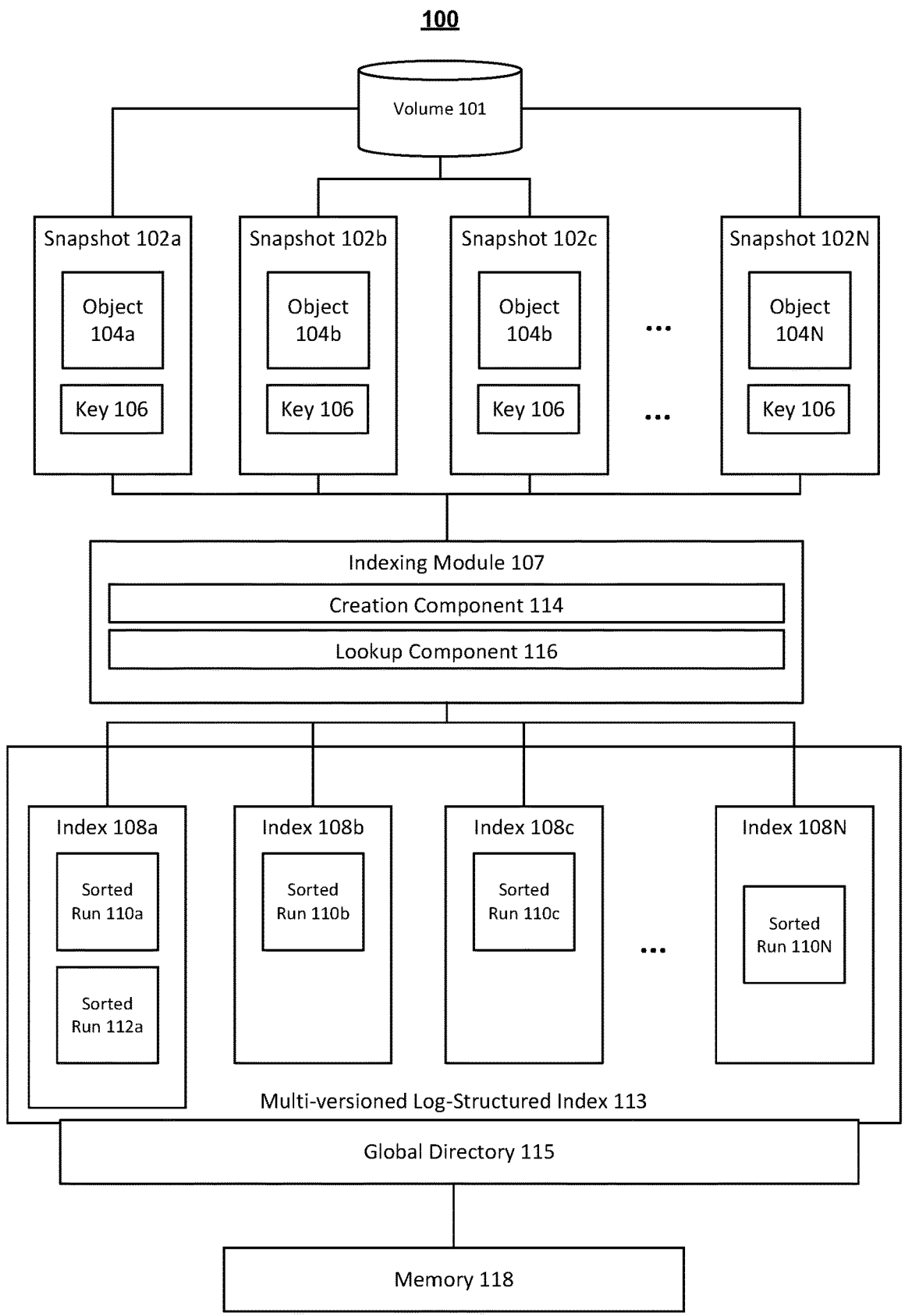
FIG. 1 is a block diagram illustrating a system for indexing multi-versioned data.

Exemplary aspects are described herein in the context of a system, method, and computer program product for indexing multi-versioned data. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes an indexing system for multi-versioned (e.g., temporal, historical, etc.) data. An index of objects is characterized by a key and a lifespan. The system includes data structures for maintaining an index for each snapshot (i.e., a static view for a specific timestamp) of a volume of a computing device. In some aspects, the index data may be shared between snapshots, and can be written to external memory in a sequential manner.

In the context of the present disclosure, a "point in time" denotes an element of a monotonically increasing sequence of non-negative integers. Due to the fact that the sequence of points in time are monotonically increasing by definition, the set of points in time is linearly ordered. Assignments from the number space may be sparse (e.g., 3, 74, 1056, 9808, etc.), or in some aspects, contiguous (e.g., 1, 2, 3, 4, 5, etc.), or in some aspects, a combination of both. For each point in time, all points in time with a lower numerical value are denoted as preceding, and all points in time with a greater numerical value are denoted as succeeding. In some aspects, a special "infinite" value, which is greater than every possible number by convention, may be added to the points in time set. The "infinite" value precedes no other point in time and succeeds every other point in time.

In some aspects, each point in time defined as an element of a numerical sequence, may be attributable to the timestamps of either physical or astronomical time, or some computer system clock. In some aspects, said timestamps may be the timestamps of database transactions.

Consider a collection of objects with keys, such that for the chosen points in a time sequence, each object has a state for each point in time. Keys are arbitrary sequences of bytes, including, but not limited to, file paths, numbers, dates, opaque character arrays, or some combination thereof. For each object identified by a key, an object version denotes a triplet of the object and two points in time (key, t1, t2), such that for each point in time between said points in time t, including the start time t1 and not including the end time t2 (i.e., t1<=t<t2), the state of said object is the same. One of the time points in time (t1) is called the start point in time of an object version hereinafter, if it precedes another point in time. The start point in time of an object version is not subject to change. The another point in time (t2) is called the end point in time of the object version hereinafter.

Hence the temporal evolution of each object can be defined as a set of its versions, as will be described in FIG. 2, where the intervals between points in time do not mutually intersect for two consecutive versions. The version of an object is called corresponding to a chosen point in time hereinafter, if the start point in time for said object version precedes the chosen point in time, and the end point in time for said object version succeeds the chosen point in time.

In the present disclosure, a snapshot denotes the collection of all object versions in a system that correspond to a chosen point of time. In some aspects, the snapshot can be seen as a read-only view for a chosen point in time. In some aspects, a snapshot may be a full backup of a volume or a partition of a volume. In the present disclosure, a volume is an identifiable unit of data storage. The volume may be physical volume (e.g., a hard disk drive, a solid state drive, etc.) or a logical volume.

It is considered that the start point in time of the object versions that appear in the system (where corresponding elements are inserted into index) is monotonically non-decreasing, such that after an object version with start point in time with numerical value X becomes present in the system, the start points in time of all object versions that newly appear after that are equal to or greater than X. It is considered then that the end point in time of the object versions that appear in the system is monotonically non-decreasing, such that after an object version with end point in time with numerical value X becomes present in the system, the end points in time of all object versions that newly appear after that are equal to or greater than X.

It is considered then that the continuous process of appearances of new object versions in a system can be split into parts, or phases, such that within each set of start points in time of all newly appeared versions with possibly different keys are equal to the same numerical value. That part is denoted as the creation of a snapshot with a number equal to this value. In other words, after an object version with key X and start point in time T1 is inserted into an index, for any key Y an object version with key Y and start point in time T2 can be inserted into the index only if T1<=T2.

Let object keys be ordered, so that for any given keys A and B, it could be said that either A precedes B, or A succeeds B, or A equals B. It should be noted that any arbitrary byte sequences can be ordered one way or another. For a given key order and given keys A and B, the keys between A and B are keys that succeed A and precede B. For given object keys A and B, a query for object versions with keys between A and B, that are corresponding for the chosen point in time are called "snapshot listing query" or a "key-range time-slice query" hereinafter. For example, in a student database, a query for a list of students in some group at a specific date is a snapshot listing query.

Let an "element" denote a key-value pair with a key within the system. Let "sorted run" denote a sorted collection of elements in a main or external memory, including but not limited to a list, an array, a search tree, a skip list, etc. A sorted run may be generated either by creation of an empty sorted run and insertion of new elements to said sorted run, one by one or in bulk, maintaining the invariant of sorted order of elements in the collection, or by merging of two or more pre-existing sorted runs. In some aspects, each sorted run can be partitioned into many parts or files. The sorted run data may be maintained in the main memory or in external memory of a computer system described in FIG. 9.

A "log-structured index" is a collection of enumerated sorted runs, which may be maintained either in the main or in external memory, with defined compaction conditions and algorithms, varying on the embodiment, and with some auxiliary structures in the main and external memory. This may include, for example, directories, bloom filters, write-ahead logs, or a combination thereof. In some aspects, the sorted runs of a log-structured index may be maintained on multiple different external memory devices.

FIG. 1 is a block diagram illustrating system 100 for indexing multi-versioned data. Suppose that volume 101 is a data storage device (e.g., HDD, SSD, etc.) or a partition of a data storage device connected to a computer system (described in FIG. 9). As the computer system is used, data on volume 101 changes. Over time, snapshots of volume 101 are generated (e.g., snapshot 102a, snapshot 102b, snapshot 102c, . . . , snapshot 102N). Each snapshot may include a plurality of objects (e.g., files, applications, directories, documents, media, metadata, etc.). For example, snapshot 102a includes object 104a. Key 106 may be an identifier of object 104a (e.g., a file path). Snapshot 102b includes object 104b, snapshot 102c includes object 104b as well, and snapshot 102N includes object 104N.

Because each object shares key 106, objects 104 represent different versions of the same object. It should be noted that object 104b may be a modified version of object 104a. Thus, at the point in time when snapshot 102b was generated, the new version of the object is identified. For example, suppose that object 104a is a document. Object 104b may be an edited version of the document. In a natural setting, objects do not constantly change from one snapshot to another. This is shown where object 104*b* remains the same between snapshot 102*b* and snapshot 102*c*.

Indexing module 107 may be a software application that generates indexes for multi-versioned data (e.g., object 104). Indexing module 107 includes creation component 114 and lookup component 116. In an exemplary aspect, indexing module 107 may generate indexes for each snapshot (e.g., index 108*a* for snapshot 102*a*, index 108*b* for snapshot 102*b*, index 108*c* for snapshot 102*c*, . . . , index 108N for snapshot 102N). Each index may include one or more sorted runs. For example, index 108*a* includes sorted run 110*a* and 112*a*, index 108*b* includes sorted run 110*b*, index 108*c* includes sorted run 110*c*, and index 108N includes sorted run 110N. In some aspects, indexing module 107 may store indexes 108 in memory 118, which may be an external memory connected to the computer system or may be a portion of volume 101.

Indexes 108 are log-structured indexes. An element in a sorted run includes the object and a key. For example, an element of sorted run 110*a* may comprise object 104*a* and key 106. As mentioned before, a log-structured index may include multiple sorted runs (e.g., sorted run 110*a*, sorted run 112*a*, etc.). A log-structured index is said to include an element if one of its sorted runs includes the element. The sorted runs of an index are enumerated from the last formed one to the first, such that the "youngest" one has the least number, and the "oldest" one has the greatest. For example, sorted run 110*a* may be "1" and sorted run 112*a* may be "2." If multiple sorted runs include elements with the same key (e.g., both sorted run 110*a* and sorted 112*a* include an element with key 106), then the log-structured index 108*a* includes the element with the value equal to the value of the element from the sorted run with the least number (i.e., sorted run 110*a*). The "oldest" sorted run may be inherited from an older snapshot. For example, some old index elements may be merged into a relatively bigger sorted run being maintained in external memory, and new elements may reside in a relatively smaller sorted run being maintained in main memory. If there are no updates for elements inserted into the "oldest" sorted run, there are no such keys in "youngest" sorted run and the values from the "oldest" are actual. Otherwise, the values from the "oldest" sorted run are obsolete and the values from the "newest" one are actual. Some embodiments may introduce another enumeration of sorted runs, but the described ordering still arises, such that the sorted runs can be enumerated in the described order. If said sorted run includes an element with a special value called a deletion marker, then there is no element with such key in the log-structured index.

The method being described has the following advantages. Firstly, the index data may be stored in an external memory (e.g., memory 118), which allows for indexing data of a large volume. For example, volume 101 may have a size greater than a threshold size that other conventional indexers are unable to efficiently index (i.e., the conventional index does not improve data retrieval times). Second, index creation and updates are characterized by a high write throughput because all writes to memory 118 can be performed in a sequential manner. This allows for the use of the index for a computer system with a large amount of changes (i.e., more than a threshold number of object changes). Third, the index supports efficient key-range time-slice queries, which are queries for objects, with keys in some defined range, whose lifespans include some fixed point in time. Fourth, the index allows to find out the difference between the states of the collection of objects being indexed between two distinct points in time.

Figure 3:
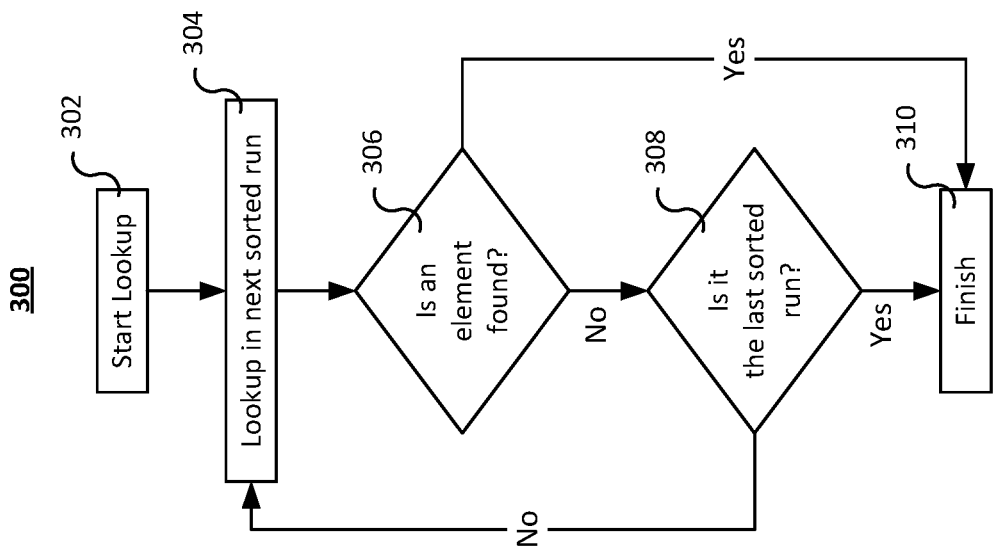
FIG. 3 is a flow diagram of a method for looking up an element in a log-structured index.

In order to lookup an element in a log-structured index, lookup component 116 looks up the element in sorted runs from ones with a lesser number to ones with a greater number illustrated further in FIG. 3). In some aspects, lookup component 116 performs ranged queries in all sorted runs and merges the results together (preferring the more recent element to an older one if the keys match).

In order to insert an element into a log-structured index, creation component 114 inserts the element into a chosen sorted run, whose number may be fixed, and that may be maintained in memory 118. If the defined compaction conditions are violated, the defined compaction algorithm executed by indexing module 107 transforms a present collection of sorted runs into a new collection, where said collections include the same set of keys, so that any defined compaction conditions are satisfied (illustrated in FIG. 5.)

If there are elements with the same key, the compaction algorithm of indexing module 107 may drop the element which was inserted earlier, replacing it with the element that was inserted more recently. The element that was inserted more recently, cannot be replaced with the element inserted earlier. After the transformation, some of the sorted runs may be equal to previously existing sorted runs (and they may be reused without copying), some of the sorted runs may be newly formed, and some sorted runs may be dropped. After the transformation, the sorted runs with lesser numbers should include elements inserted more recently, such that if there are two sorted runs including elements with the same key, the sorted run with the lesser number includes the element inserted more recently. Therefore, after the transformation, the log-structured index includes elements inserted more recently, even if some sorted runs may still include elements with the same keys inserted earlier. For the sorted runs maintained in memory 118, it is preferred to write the sorted run data in a sequential manner, although it may not be required in some aspects. This may significantly improve the performance of the index. In some aspects, the sorted runs that are maintained in memory 118 may be immutable, such that they can be created or deleted as a whole, but not partly changed. This immutability allows for the use of the "write once, read many" (WORM) devices for the sorted run data.

An element deletion is performed via insertion of an element with the same key and a special deletion marker value. In some aspects, the defined compaction algorithm may eliminate some keys if there are elements with a deletion marker value.

Let multi-versioned log-structured object index 113 denote a plurality of snapshot indexes 108 with shared and private sorted runs (described in FIG. 7), alongside a global directory (e.g., global directory 115) structure with a list of sorted run links for each snapshot. The global directory structure stores any combination of sorted run numbers, indexes, offsets, and/or descriptors that belong to each snapshot, such that the sorted runs presented in a global directory list for a particular snapshot compose a log-structured snapshot index for the particular snapshot. For example, for a multi-versioned log-structured object index shown in FIG. 7, the corresponding global directory is shown in the table below. A global directory can be maintained either in a main or an external memory as a list of lists, tree of lists, list of trees, tree of trees, hash table of lists, hash table of trees, etc.

TABLE 1

Global Directory

| Snapshot | Sorted runs |
|---|---|
| 1 (701) | 704, 707, 709, 710, 711 |
| 2 (702) | 705, 708, 709, 710, 711 |
| 3 (703) | 706, 708, 709, 710, 711 |

In order to retrieve a version of object A corresponding to a point in time (i), lookup component 116 selects a snapshot for a point in time (i) and performs lookup in the log-structured index of that snapshot. In some aspects, it may take O(1) operations to select a snapshot in the global directory, and O(log(N)) operations to perform a lookup in a single sorted run that belongs to that snapshot, where N is the total number of elements in the snapshot. Therefore it may take O(S*log(N)) operations total, where S is the number of sorted runs in the snapshot. In some aspects, sorted run size may grow at an exponential rate, such that each sorted run is X times greater than the previous one. In said embodiments, the operation of object version retrieval may take O(log(N)) operations.

In order to execute a snapshot listing query (key-range time-slice query) for a point in time (i), lookup component 116 selects a snapshot for a point in time (i) and performs key-range query on the log-structured index. In some aspects, it may take O(1) operations to select a snapshot in the global directory, O(log(N)) operations to perform a lookup for a start element in each sorted run, and O(K) operations to retrieve and merge result lists of K keys. Therefore, in embodiments with sorted run size growing at exponential rate, the snapshot listing query may take O(log(N))+O(K) operations.

Figure 2:
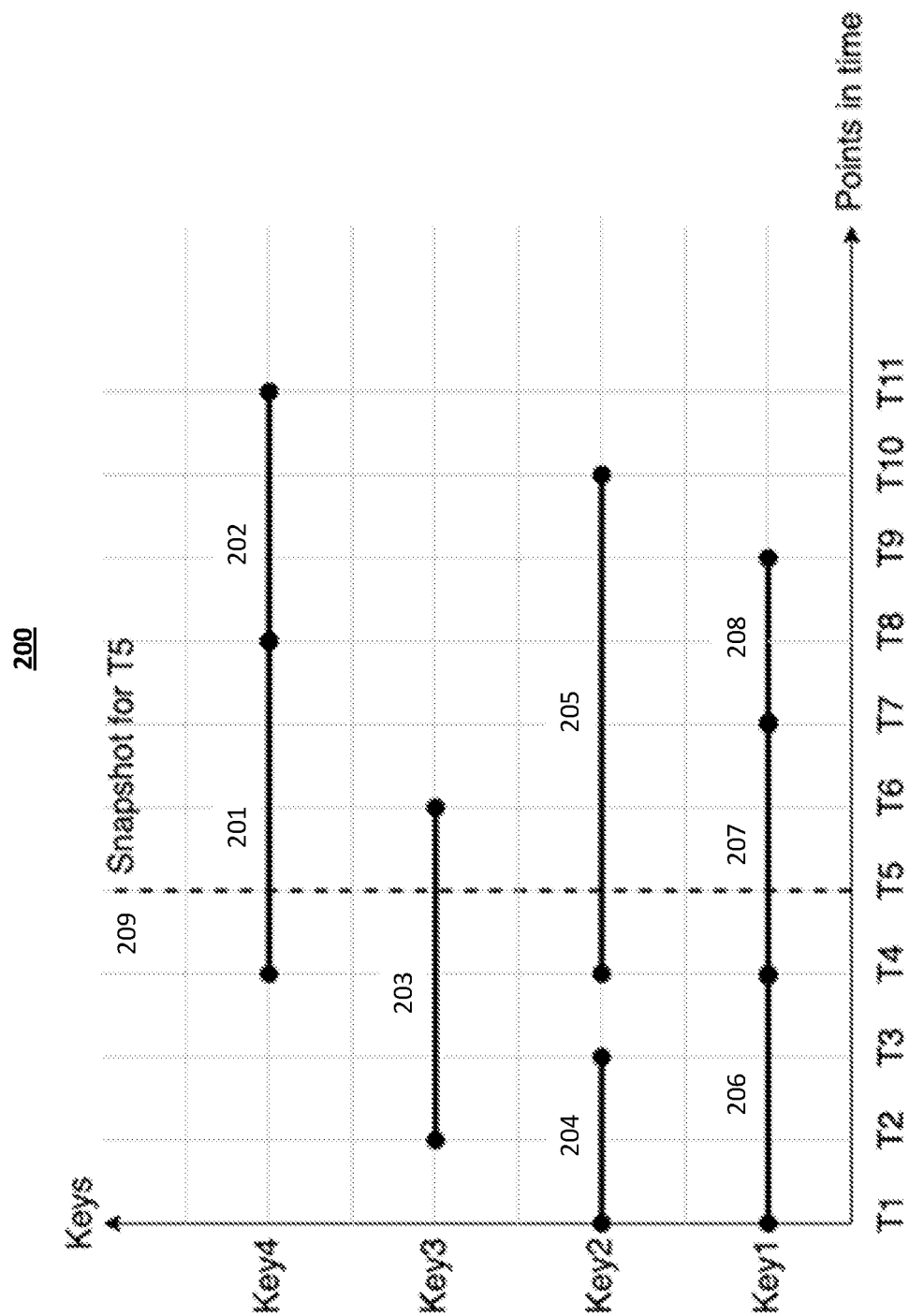
FIG. 2 is a diagram of multi-versioned objects and a snapshot.

FIG. 2 is a diagram 200 of multi-versioned objects and a snapshot. An object with the key equal to Key1 has three versions. The start point in time of the first version (206) is equal to T1, and the end point is equal to T4. The start point in time of the second version (207) is equal to T4 and the end point is equal to T7. The start point in time of the third version (208) is equal to T7 and the end point is equal to T9.

An object with the key equal to Key2 has two versions. The start point in time of the first version (204) is equal to T1, and the end point is equal to T3. At T3, the object may be deleted. At T4, the object with the same key is re-inserted in the volume. The start point in time of the second version (205) is equal to T4 and the end point is equal to T10.

An object with the key equal to Key3 has a single version (203). Its start point in time is equal to T2 and the end point is equal to T6.

An object with the key equal to Key4 has two versions. The start point in time of the first version (201) is equal to T4, and the end point is equal to T5. The start point in time of the second version (202) is equal to T5 and the end point is equal to T11.

The snapshot of T5 (209) includes second version of the object with Key1 key, the sole version of the object with Key3 key, and the second version of the object with Key4 key.

FIG. 3 is a flow diagram of method 300 for looking up an element in a log-structured index. At 302, lookup component 116 initiates the lookup. At 304, lookup component 116 performs a lookup in the next sorted run. At 306, lookup component 116 determines whether the element was found. In response to determining that the element was found, method 300 finishes at 310. If the element is not found, method 300 advances to 308, where lookup component 116 determines whether the sorted run is the last sorted run to consider. If there are more sorted runs, method 300 returns to 304, where lookup component 116 performs a lookup in the next sorted run. If there are no more sorted runs to consider, method 300 finishes at 310, where in this case the element is not found.

Figure 4:
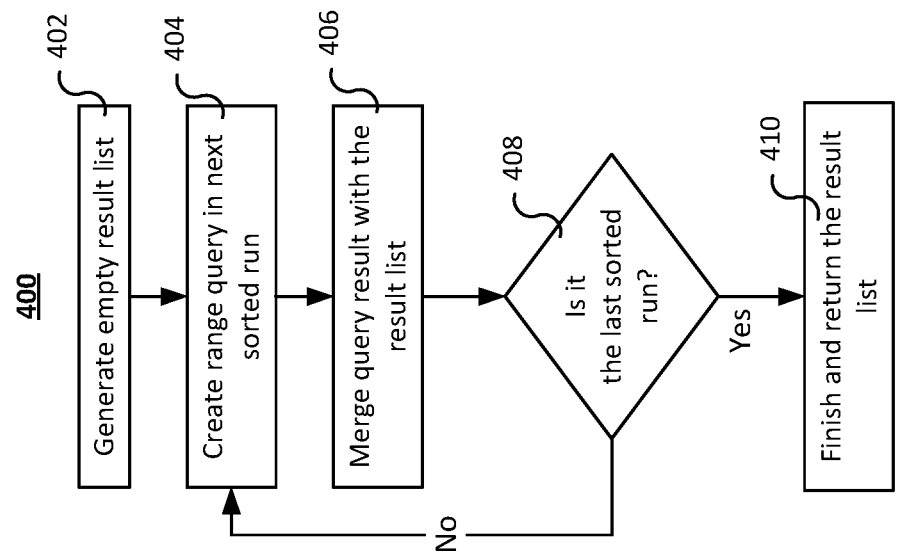
FIG. 4 is a flow diagram of a method for performing a range query in a log-structured index.

FIG. 4 is a flow diagram of method 400 for performing a range query in a log-structured index. At 402, lookup component 116 generates an empty result list. At 404, lookup component 116 creates a range query in the next sorted run. At 406, lookup component 116 merges the query result with the result list generated in 402. At 408, lookup component 116 determines whether the sorted run is the last sorted run to consider. If there are more sorted runs, method 400 returns to 404, where lookup component 116 creates another range query in the next sorted run. If there are no more sorted runs to consider, method 400 finishes at 410, where lookup component 116 returns the result list.

Figure 5:
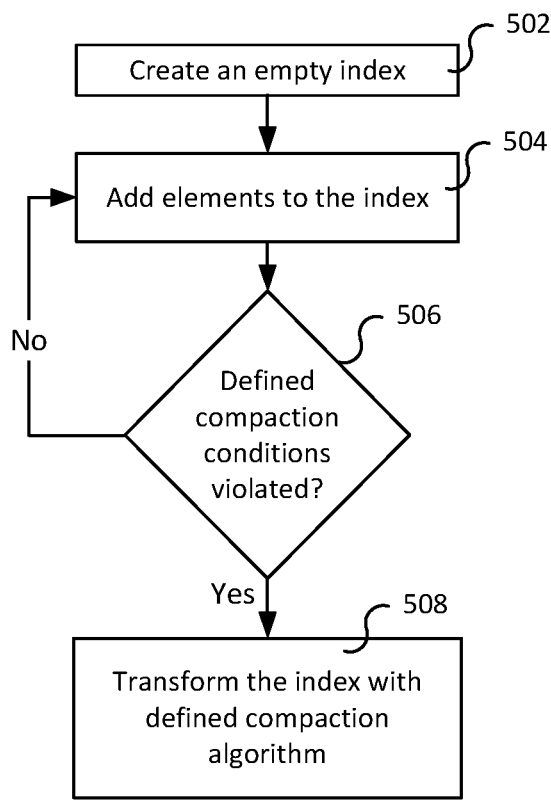
FIG. 5 is a flow diagram of a method for constructing log-structured object index.

FIG. 5 is a flow diagram of method 500 for constructing log-structured object index. At 502, indexing module 107 creates an empty index. At 504, indexing module 107 adds elements to the index. At 506, indexing module 107 determines whether defined compaction condition(s) have been violated. If violations are determined, method 500 advances to 508, where indexing module 107 transforms the index with a defined compaction algorithm. Otherwise, method 500 returns to 504 and additional elements can be added to the index.

A widely known fact is that random writes to an external memory, such as hard-disk drives, solid-state drives and network storage (for which "random writes" mean the constant change of an object/extent to be written) have significantly poorer performance, than sequential writes. Moreover, some external memory devices (such as tapes) do not support random writes at all. Hence in order to achieve the best performance and in order to support a wide range of external memory devices, the algorithm that applies writes to an external memory device should write data to an external memory device in a sequential manner. The next thing to consider is that the main memory amount is limited in present-day computer systems, such that a significantly large index cannot fully reside in the main memory. Therefore, the unavoidability of external memory usage arises. In some aspects, the new elements inserted into the index are always inserted into a main memory resident sorted run first, so it can be inserted at any position in said sorted run while keeping it sorted. As the main memory resident sorted run or sorted runs cannot grow infinitely, the data of the main memory resident components should eventually be merged with the data of the external memory resident components using sequential I/O. Such a merging can imply rewriting of some data again and again, so that it is needed to perform more actual write operations than is needed for writing an already prepared and sorted data. This phenomenon is widely known as write amplification. In order to decrease the write amplification effect, more than one external memory component may be maintained, in some aspects, than can be merged and compacted with various, possibly sophisticated, rules, in order to achieve lower write amplification, lesser space needed to store the data, etc. The algorithm defining the rules of moving data from main memory into an external memory, as well as the creation, merging, and compaction of external memory components, is called a compaction algorithm. The widely known examples of compaction algorithms are Levelled Log-Structure Merge Tree algorithm, Tiered Log-Structure Merge Tree algorithm, although any other compaction algorithms can be used.

Figure 6:
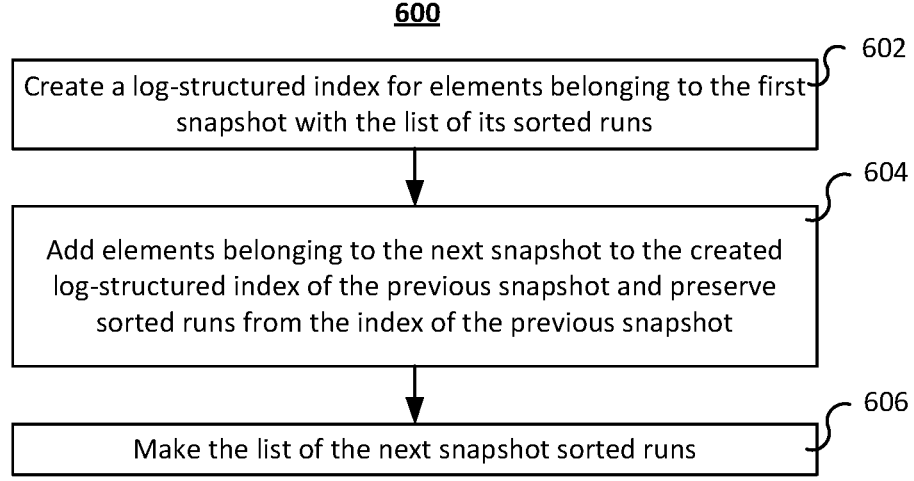
FIG. 6 is a flow diagram of a method for constructing a multi-versioned log-structured object index.

FIG. 6 is a flow diagram of method 600 for constructing a multi-versioned log-structured object index. At 602, creation component 114 creates a log-structured index for elements belonging to the first snapshot with the list of its sorted runs. At 604, creation component 114 adds elements belonging to the next snapshot to the created log-structured index of the previous snapshot and preserves sorted runs from the index of the previous snapshot. At 606, creation component 114 creates a list of sorted runs for the next snapshot. In some aspects, after 606, method 600 returns to 604.

Figure 7:
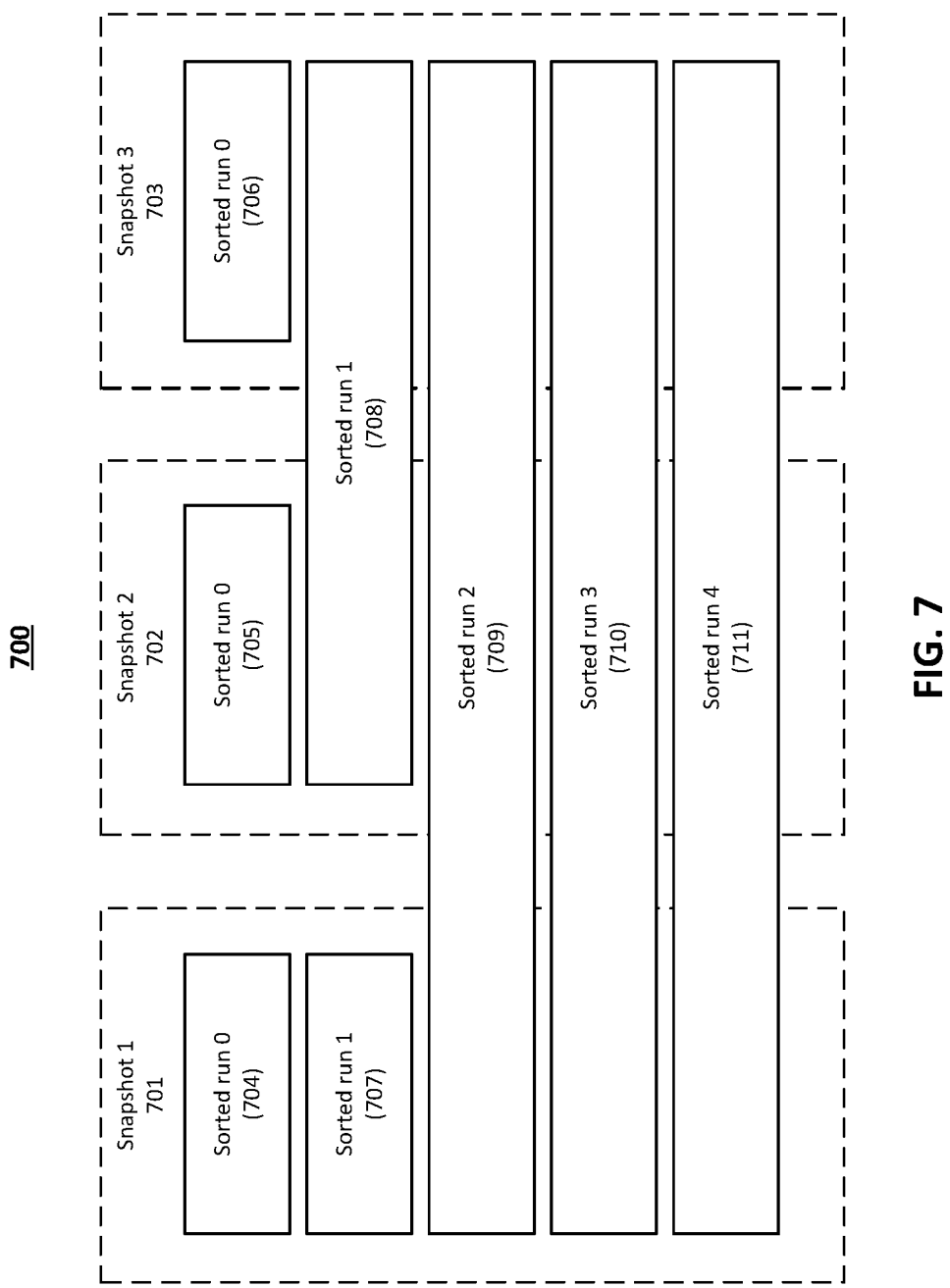
FIG. 7 is a diagram of sorted run collections for multiple snapshots.

FIG. 7 is diagram 700 of sorted run collections for multiple snapshots. In diagram 700, some sorted runs are shared (versioned log-structured index). The index of the snapshot for the point in time 1 (snapshot 1, 701) consists of sorted run number 0 (704), sorted run number 1 (707), sorted run number 2 (709), sorted run number 3 (710) and sorted run number 4 (711).

The index of the snapshot for the point in time 2 (snapshot 2, 702) consists of sorted run number 0 (705), sorted run number 1 (708), sorted run number 2 (709), sorted run number 3 (710) and sorted run number 4 (711). In diagram 700, sorted runs with numbers greater than 1 are shared with snapshot 1, the sorted run number 0 is distinct from the sorted run number 0 from the snapshot 1, and the sorted run number 1 is distinct from the sorted run number 1 from the snapshot 1.

The index of the snapshot for the point in time 3 (snapshot 3, 703) consists of sorted run number 0 (706), sorted run number 1 (708), sorted run number 2 (709), sorted run number 3 (710) and sorted run number 4 (711). Here, sorted runs with numbers greater than 0 are shared with snapshot 2, and the sorted run number 0 is distinct from the sorted run number 0 from the snapshot 1 and from the sorted run number 0 from snapshot 2. The present disclosure provides a method for the indexation of temporal data (i.e., the indexation of objects characterized by key and lifespan simultaneously).

In an exemplary aspect, creation component 114 creates a log-structured index of all object versions with a start point in time equal to a first point in time in a sequence (referred to as elements belonging to the first snapshot). Here, the object keys serve as the keys of log-structured index elements simultaneously.

In some aspects, there may be a list that stores links or on-disk offsets to sorted runs. In order to add object versions that start with a second point in time, creation component 114 creates a copy of selected sorted runs that, in some aspects, may be maintained in main memory 118. The copy is used to add new objects or objects with a changed state, in such a way that a sorted run with added elements is a sorted run too.

If all object versions with the start point in time equal to the second point of time can be added to said sorted run copy without violation of defined log-structured index compaction conditions, the combination of said sorted run copy with added elements and all sorted runs that include object versions with the start point in time equal to the first point in time, except said original sorted run, is a well-formed log-structured index itself that includes all and only object versions corresponding for a second point in time. On the other hand, the combination of said original sorted run and all sorted runs that include object versions starting with the first point in time, except said original sorted run remains a well-formed log-structured index that includes all and only object versions corresponding for a first point in time.

An example is shown in FIG. 7, where snapshot 1 (701) has a log-structured index for a first point of time, snapshot 2 (702) has a log-structured index for a second point of time, and snapshot 3 (703) has a log-structured index for a third point of time. Each snapshot consists of four sorted runs, where sorted runs (704) and (707) are private for snapshot 1, sorted run (705) is private for snapshot 2, and sorted run (706) is private for snapshot 3. Sorted run (708) is shared by snapshot 2 and snapshot 3, which means that the lookup procedure for both snapshot 2 and snapshot 3 will search for an element in sorted run (708) if needed. Lastly, sorted runs (709), (710) and (711) are shared by all three indexes of the three snapshots. The sorted run sharing arises because a new snapshot index creation can be viewed as a modification of the previous snapshot index with copy-on-write semantics. Such copy-on-write modification is essential in order to build up a new snapshot index quickly. Moreover, the sorted run sharing decreases the total size of multi-version index and allows to calculate the difference between snapshots efficiently, because only non-shared sorted runs are to be compared in the case. In the example above, the sorted run 1 (708) belongs to both snapshot 2 and snapshot 3, with the identical set of elements. It does not mean that both snapshot 2 and snapshot 3 necessarily contain those very elements, though, because their corresponding sorted runs 0 (705 for snapshot 2 and 706 for snapshot 3) may contain newer versions of some objects, including deletion markers.

According to the snapshot definition above, the combination of said sorted run copy with added elements and all sorted runs that include object versions with the start point in time equal to the first point in time, except said original sorted run includes all and only elements of a snapshot for a second point in time, and hence can be called a snapshot index for a second point in time. Then, in a similar fashion, the combination of said original sorted run and all sorted runs that include object versions with the start point in time equal to the first point in time, except said original sorted run includes all and only elements of a snapshot for a first point in time, and hence can be called a snapshot index for a first point in time.

If there are more object versions with the start point in time equal to the second point in time, that can be added to said sorted run copy without violating defined log-structured index compaction conditions, the defined compaction algorithm of indexing module 107 transforms a present collection of sorted runs, consisting of said sorted run copy with added elements and all sorted runs that include object versions with the start point in time equal to the first point in time into a new collection, where said collections include the same set of elements, so that defined compaction conditions are satisfied.

After the transformation, a subset of the sorted runs may be equal to previously existing sorted runs (and in some aspects they may be reused without copying), a subset of the sorted runs may be newly formed, and a subset of sorted runs may not be included into a new collection. The latter of sorted runs may be physically deleted from the device or just excluded logically. This step of the insertion procedure may repeat itself, in a way that the elements to be inserted are inserted into a chosen sorted run that was made as a copy of a previously existing chosen sorted run, referred to as the sorted run copy with added elements above, and if the defined compaction conditions are violated, the sorted run collection from the previous step is transformed via a defined compaction algorithm.

Sorted runs that include only elements belonging to the first snapshot are not to be deleted from a system. Sorted runs that include elements not belonging to the first snapshot may be deleted if they are not included into resulting collections of sorted runs that a defined compaction algorithm produces.

After all object versions with the start point in time equal to the second point in time are added, there are two collections of sorted runs in a system. The first one is a collection of sorted runs that include only elements belonging to the first snapshot. The second one is a collection of sorted runs that include both object versions with the start point in time equal to the second point in time, and object versions with the start point in time equal to the first point in time. Both collections can be viewed as well-formed log-structured indexes (with the addition of some auxiliary structures depending on the embodiment).

Because after the transformations of subsequently applied compaction algorithms the resulting log-structured index includes the elements that were inserted more recently, the second index includes object versions with the start point in time equal to the first point in time only if there no object version with the start point in time equal to the second point in time with the same key (including deletion markers). Therefore the second index includes elements belonging to the second snapshot. In some aspects there may be two lists, the first one that includes links to sorted runs belonging to the index of the first snapshot, and the second one that includes links to sorted runs belonging to the index of the second snapshot.

For third, fourth, and subsequent points in time, the insertion process repeats itself, and an index of snapshot (i) can share its sorted runs with an index of each preceding snapshot 0, . . . , i−1, as well as with an index of each succeeding snapshot i+1, . . . , T, where T is a total number of snapshots, as illustrated in FIG. 2. Hence each snapshot index consists of its own sorted runs and sorted runs that it shares with the snapshots of preceding points in time (and with the snapshots of succeeding points in time as well).

In order to get a difference between two snapshots, indexing module 107 determines a difference between corresponding log-structured indexes. In order to do so, indexing module 107 compares only sorted runs that are not shared between said snapshots and traverses through all keys in said sorted runs in sorted order. Here, time is saved because all the shared sorted runs are not to be taken into account.

In order to remove a snapshot (e.g., according to a data retention policy), indexing module 107 maintains reference counters for the sorted runs, such that the counter for each sorted run is equal to the number of the snapshot indexes that include the sorted run. Indexing module 107 holds a reference to the sorted run from its sorted run directory, and removes them if a reference counter value become equal to zero. In some aspects, such reference counters are calculated by indexing module 107 in real-time rather than stored.

In some aspects, there may be an amount of data not relevant to a particular snapshot, but stored in its sorted runs and shared with older snapshots. Indexing module 107 may handle this data by a compaction procedure. The compaction procedure with various sorted run optimizations can be executed by indexing module 107 in the background on non-last snapshots as they are immutable. In some aspects shared sorted runs may be split to private sorted runs for better performance.

Figure 8:
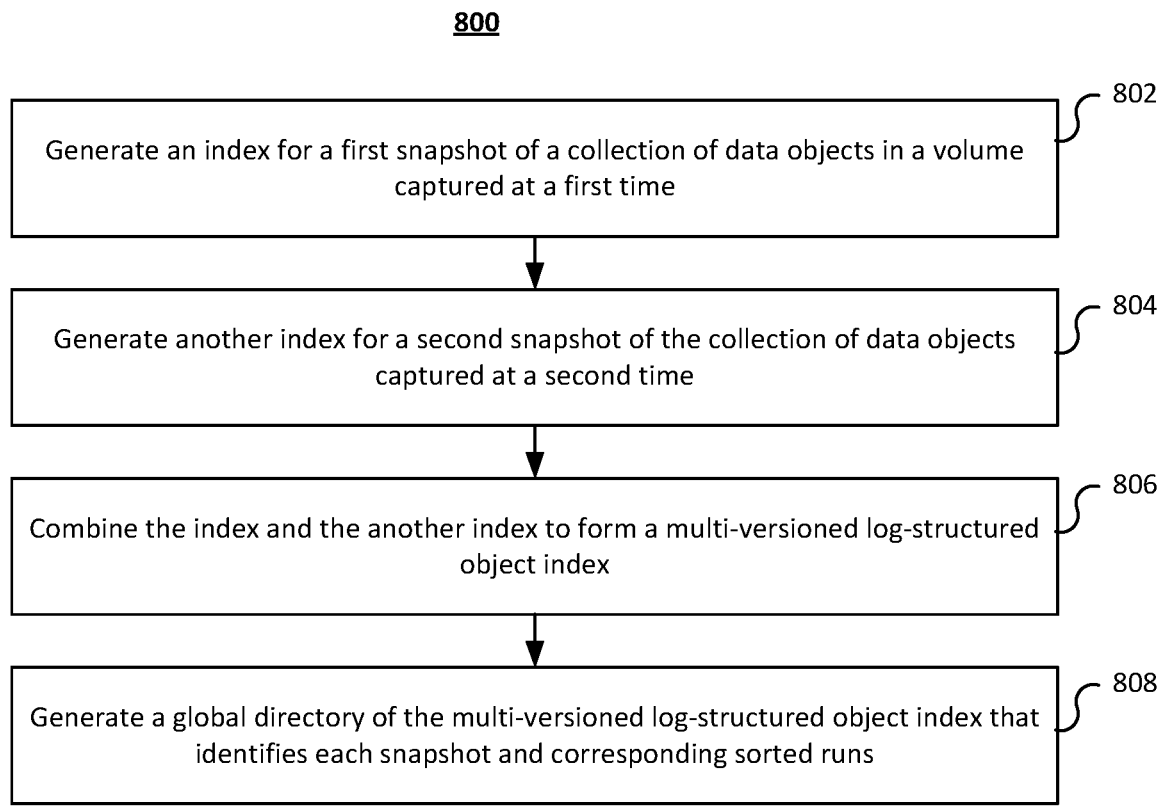
FIG. 8 is a flow diagram illustrating a detailed method for indexing multi-versioned data.

FIG. 8 is a flow diagram illustrating method 800 for indexing multi-versioned data.

At 802, indexing module 107 generates an index for a first snapshot of a collection of data objects in a volume captured at a first time, wherein each data object is identified by a respective key. The index comprises either a sorted run that includes a first data object and a second data object, or a first sorted run that includes a first data object and a second sorted run that includes a second data object if said data objects cannot be added to a single sorted run without violation of the defined conditions. In some aspects, said sorted runs are stored either in main memory or in external computer memory. Said sorted runs can be generated as a result of merging and compaction of some temporary sorted runs. The conditions are designed in a way that the index being generated can be generated in a computer system with limited main memory amount, and wherein parameters of said conditions may vary on the concrete computer system being used.

At 804, indexing module 107 generates another index for a second snapshot of the collection of data objects captured at a second time, using the index for the first snapshot for its generation. The another index comprises another sorted run that includes either a different version of the first data object and a same version of the second data object or just a different version of the first data object. Said sorted run can be stored either in main memory or in external computer memory, and can be generated as a result of merging and compaction of some temporary sorted runs and the sorted runs from the index for a first snapshot (the same conditions for generation are in effect as 802).

At 806, indexing module 107 combines the index and the another index to form a multi-versioned log-structured object index that has all sorted runs of the index and the another index combined together. The combination is made up of either (1) a first sorted run with a version of the first data object at the first time, a second sorted run with the different version of the first data object, and a third sorted run with the second data object, or (2) a first sorted run with a version of the first data object at the first time alongside the second data object, and a second sorted run with the different version of the first data object alongside the second data object, or (3) a first sorted run with a version of the first data object at the first time alongside the second data object and a second sorted run with the different version of the first data object, or (4) a first sorted run with a version of the first data object at the first time, a second sorted run with the second data object and a third sorted run with the different version of the first data object alongside the second data object (depending on the index shape and the another index shape).

The combining further comprises, at 808, indexing module 107 generating a global directory of the multi-versioned log-structured object index that identifies each snapshot and corresponding sorted runs such that in case (1), the first sorted run is mapped to the first snapshot, the second sorted run is mapped to the second snapshot, and the third sorted run is mapped to both the first snapshot and the second snapshot; in case (2), the first sorted run is mapped to the first snapshot, and the second sorted run is mapped to the second snapshot; in case (3), the first sorted run is mapped to both the first snapshot and the second snapshot, and the second sorted run is mapped to the second snapshot; and in case (4), the first and second sorted runs are mapped to the first snapshot and the third sorted run is mapped to the second snapshot.

FIG. 9 is a flow diagram illustrating method 900 for indexing multi-versioned data.

At 902, indexing module 107 generates a first index for a first snapshot of a collection of data objects in a volume captured at a first time. The first index comprises one or more sorted runs that include a first data object and a second data object stored in the collection. Each data object is identified by a respective key;

At 904, indexing module 107 generates a second index for a second snapshot of the volume captured at a second time. The second index comprises a subset of sorted runs from the first index and one or more additional sorted runs that include a different version of the first data object and optionally a same version of the second data object.

At 906, indexing module 107 combines the first and the second index to form a multi-versioned log-structured object index that has sorted runs from both indexes.

At 908, indexing module 107 generates a global directory of the multi-versioned log-structured object index that identifies each snapshot and corresponding sorted runs such that the one or more sorted runs of the first index are mapped to the first snapshot, the one or more additional sorted runs of the second index are mapped to the second snapshot, and wherein the subset of sorted runs are mapped to the first snapshot and the second snapshot.

More specifically, the multi-versioned log-structured object index has a first sorted run with a version of the first data object at the first time, a second sorted run with the different version of the first data object, and a third sorted run with the second data object. The global directory maps the first sorted run to the first snapshot, the second sorted run to the second snapshot, and the third sorted run to both the first snapshot and the second snapshot.

In some aspects, indexing module 107 adds a respective index of each new snapshot captured of the volume to the multi-versioned log-structured object index and updating the global directory such that new data object versions are included in sorted runs specific to the respective index and common data object versions are included in sorted runs shared by multiple snapshots.

In some aspects, adding the respective index comprises adding, to the multi-versioned log-structured object index, elements of the respective index to elements of a previous snapshot with copy-on-write semantics, such that two or more snapshot indexes can share one or more sorted runs.

In some aspects, generating the index for the first snapshot comprises creating an empty index; adding, to the empty index, data entries corresponding to elements in the first snapshot in the one or more sorted runs; and constructing a directory that identifies the one or more sorted runs of the first snapshot.

In some aspects, indexing module 107 determines whether the multi-versioned log-structured object index violates a compaction condition, and transforms, via a compaction algorithm, the multi-versioned log-structured object index to meet the compaction condition.

In some aspects, indexing module 107 reduces space amplification and/or write amplification.

In some aspects, lookup component 116 performs a point lookup query for a specific snapshot in the multi-versioned log-structured object index.

In some aspects, lookup component 116 performs a key-range query for a specific snapshot by performing ranged queries in all sorted runs of the specific snapshot and merges results of the ranged queries together, wherein a more recent data object version is included in the merged results when individual ranged query results feature data objects with matching keys.

In some aspects, indexing module 107 calculates a difference between snapshots in the multi-versioned log-structured object index by traversing through all keys in non-shared sorted runs.

In some aspects, sorted runs of the multi-versioned log-structured object index are distributed in any combination of a main memory and an external memory.

In some aspects, sorted runs of the multi-version log-structured object index are maintained on different devices with different data access latencies.

In some aspects, at least one sorted run of the multi-versioned log-structured object index is maintained in a write once read many (WORM) device.

In some aspects, indexing module 107 maintains reference counters for sorted runs of the multi-versioned log-structured object index, wherein a respective counter for each respective sorted run is equal to a number of snapshot indexes that share the respective sorted run.

In some aspects, a specific sorted run is removable when a reference counter value for the specific sorted run equal zero. Indexing module 107 may thus remove the specific sorted run from the multi-versioned log-structured object index, wherein removal is one of a physical data removal from a storing device of the multi-versioned log-structured object index or a logical removal.

Figure 10:
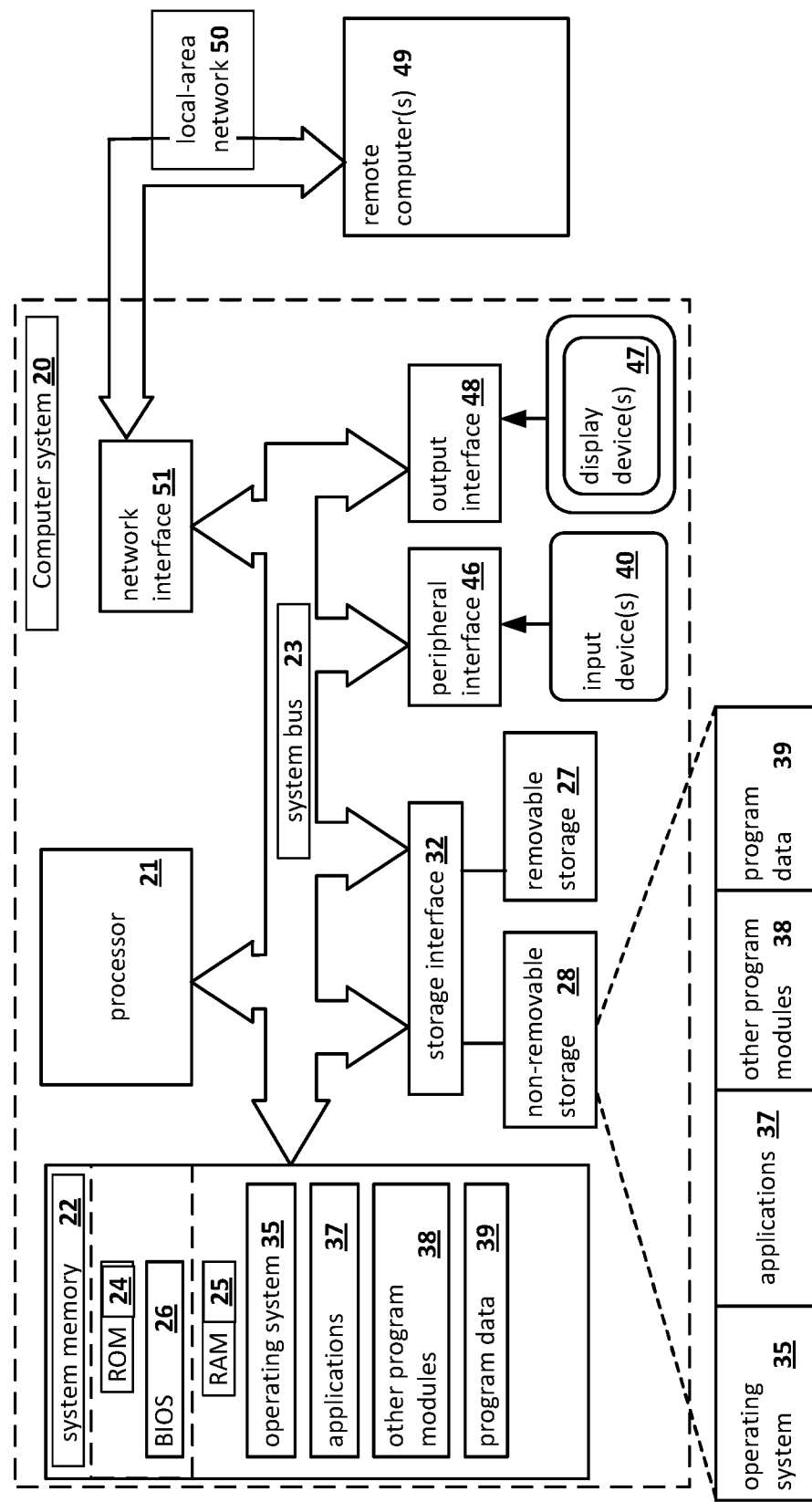
FIG. 10 presents an example of a general-purpose computer system on which aspects of the present disclosure can be implemented.

FIG. 10 is a block diagram illustrating a computer system 20 on which aspects of systems and methods for indexing multi-versioned data may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-9 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for multi-versioned indexing of data objects, the method comprising:
generating a first index for a first snapshot of a collection of data objects in a volume captured at a first time, wherein the first index comprises one or more sorted runs that include an initial version of a first data object and an initial version of a second data object stored in the collection, and wherein each data object is associated with a different key;
generating a second index for a second snapshot of the volume captured at a second time, wherein the second index comprises a (1) subset of sorted runs from the first index, wherein the subset includes the initial version of the second data object, and (2) one or more additional sorted runs that include a different version of the first data object;
combining the first and the second index to form a multi-versioned log-structured object index that has sorted runs from both indexes, wherein the multi-versioned log-structured object index has a first sorted run with the initial version of the first data object at the first time, a second sorted run with the different version of the first data object, and a third sorted run with the second data object;
wherein the combining further comprises generating a global directory of the multi-versioned log-structured object index that identifies each snapshot and corresponding sorted runs such that the global directory maps the first sorted run to the first snapshot, the second sorted run to the second snapshot, and the third sorted run to both the first snapshot and the second snapshot; and
calculating and outputting a difference between snapshots in the multi-versioned log-structured object index by traversing through all keys in sorted runs not mapped to multiple snapshots.

2. The method of claim 1, further comprising:
adding a respective index of each new snapshot captured of the volume to the multi-versioned log-structured object index and updating the global directory such that new data object versions are included in sorted runs specific to the respective index and common data object versions are included in sorted runs shared by multiple snapshots.

3. The method of claim 2, wherein adding the respective index comprises:
adding, to the multi-versioned log-structured object index, elements of the respective index to elements of a previous snapshot with copy-on-write semantics, such that two or more snapshot indexes can share one or more sorted runs.

4. The method of claim 1, wherein generating the index for the first snapshot comprises:
creating an empty index;
adding, to the empty index, data entries corresponding to elements in the first snapshot in the one or more sorted runs; and
constructing a directory that identifies the one or more sorted runs of the first snapshot.

5. The method of claim 1, further comprising:
determining whether the multi-versioned log-structured object index violates a compaction condition; and
transforming, via a compaction algorithm, the multi-versioned log-structured object index to meet the compaction condition.

6. The method of claim 5, further comprising reducing space amplification and/or write amplification.

7. The method of claim 1, further comprising performing a point lookup query for a specific snapshot in the multi-versioned log-structured object index.

8. The method of claim 1, further comprising:
performing a key-range query for a specific snapshot by performing ranged queries in all sorted runs of the specific snapshot and merging results of the ranged queries together, wherein a more recent data object version is included in the merged results when individual ranged query results feature data objects with matching keys.

9. The method of claim 1, wherein sorted runs of the multi-versioned log-structured object index are distributed in any combination of a main memory and an external memory.

10. The method of claim 1, wherein sorted runs of the multi-version log-structured object index are maintained on different devices with different data access latencies.

11. The method of claim 10, wherein at least one sorted run of the multi-versioned log-structured object index is maintained in a write once read many (WORM) device.

12. The method of claim 1, further comprising maintaining reference counters for sorted runs of the multi-versioned log-structured object index, wherein a respective counter for each respective sorted run is equal to a number of snapshot indexes that share the respective sorted run, and wherein a specific sorted run is removable when a reference counter value for the specific sorted run equal zero.

13. The method of claim 12, further comprising removing the specific sorted run from the multi-versioned log-structured object index, wherein removal is one of a physical data removal from a storing device of the multi-versioned log-structured object index or a logical removal.

14. A system for multi-versioned indexing of data objects, comprising:

a memory; and a hardware processor communicatively coupled with the memory and configured to:

generate a first index for a first snapshot of a collection of data objects in a volume captured at a first time, wherein the first index comprises one or more sorted runs that include an initial version of a first data object and an initial version of a second data object stored in the collection, and wherein each data object is associated with a different key;

generate a second index for a second snapshot of the volume captured at a second time, wherein the second index comprises a (1) subset of sorted runs from the first index, wherein the subset includes the initial version of the second data object, and (2) one or more additional sorted runs that include a different version of the first data object;

combine the first and the second index to form a multi-versioned log-structured object index that has sorted runs from both indexes, wherein the multi-versioned log-structured object index has a first sorted run with the initial version of the first data object at the first time, a second sorted run with the different version of the first data object, and a third sorted run with the second data object;

wherein the combining further comprises generating a global directory of the multi-versioned log-structured object index that identifies each snapshot and corresponding sorted runs such that the global directory maps the first sorted run to the first snapshot, the second sorted run to the second snapshot, and the third sorted run to both the first snapshot and the second snapshot; and calculate and output a difference between snapshots in the multi-versioned log-structured object index by traversing through all keys in sorted runs not mapped to multiple snapshots.

15. The system of claim 14, wherein the hardware processor is further configured to:

add a respective index of each new snapshot captured of the volume to the multi-versioned log-structured object index and updating the global directory such that new data object versions are included in sorted runs specific to the respective index and common data object versions are included in sorted runs shared by multiple snapshots.

16. The system of claim 15, wherein the hardware processor is further configured to add the respective index by:

adding, to the multi-versioned log-structured object index, elements of the respective index to elements of a previous snapshot with copy-on-write semantics, such that two or more snapshot indexes can share one or more sorted runs.

17. A non-transitory computer readable medium storing thereon computer executable instructions for multi-versioned indexing of data objects, including instructions for:

generating a first index for a first snapshot of a collection of data objects in a volume captured at a first time, wherein the first index comprises one or more sorted runs that include an initial version of a first data object and an initial version of a second data object stored in the collection, and wherein each data object is associated with a different key;

generating a second index for a second snapshot of the volume captured at a second time, wherein the second index comprises a (1) subset of sorted runs from the first index, wherein the subset includes the initial version of the second data object, and (2) one or more additional sorted runs that include a different version of the first data object;

combining the first and the second index to form a multi-versioned log-structured object index that has sorted runs from both indexes, wherein the multi-versioned log-structured object index has a first sorted run with the initial version of the first data object at the first time, a second sorted run with the different version of the first data object, and a third sorted run with the second data object;

wherein the combining further comprises generating a global directory of the multi-versioned log-structured object index that identifies each snapshot and corresponding sorted runs such that the global directory maps the first sorted run to the first snapshot, the second sorted run to the second snapshot, and the third sorted run to both the first snapshot and the second snapshot; and calculating and outputting a difference between snapshots in the multi-versioned log-structured object index by traversing through all keys in sorted runs not mapped to multiple snapshots.

* * * * *